(12) United States Patent
Lee et al.

(10) Patent No.: US 9,835,067 B2
(45) Date of Patent: Dec. 5, 2017

(54) EXHAUST PURIFICATION DEVICE AND METHOD OF CALCULATING NOX MASS REDUCED FROM LEAN NOX TRAP DURING REGENERATION

(71) Applicants: HYUNDAI MOTOR COMPANY, Seoul (KR); FEV GMBH

(72) Inventors: Jin Ha Lee, Seoul (KR); Jin Woo Park, Suwon-si (KR); Sera Lim, Hwaseong-si (KR); Joschka Schaub, Aachen (DE); Thomas Wittka, Kornelimünster (DE); Alexander Vovk, Aachen (DE)

(73) Assignees: HYUNDAI MOTOR COMPANY, Seoul (KR); FEV GMBH, Aachen (DE)

( * ) Notice: Subject to any disclaimer, the term of this patent is extended or adjusted under 35 U.S.C. 154(b) by 75 days.

(21) Appl. No.: 14/955,955

(22) Filed: Dec. 1, 2015

(65) Prior Publication Data

US 2016/0290197 A1  Oct. 6, 2016

(30) Foreign Application Priority Data

Mar. 30, 2015 (KR) .......................... 10-2015-0044461

(51) Int. Cl.
*F01N 3/08* (2006.01)
*F01N 3/035* (2006.01)
(Continued)

(52) U.S. Cl.
CPC .......... *F01N 3/0814* (2013.01); *F01N 3/035* (2013.01); *F01N 3/0835* (2013.01);
(Continued)

(58) Field of Classification Search
CPC .... F01N 3/0814; F01N 3/0842; F01N 3/2073; F01N 3/208; F01N 9/005; F01N 13/009; F01N 2250/12; F01N 2430/06; F01N 2570/12; F01N 2570/14; F01N 2570/18; F01N 2610/02; F01N 2610/146;
(Continued)

(56) References Cited

U.S. PATENT DOCUMENTS 5,756,057 A * 5/1998 Tsuchitani ......... B01D 53/8628
423/213.2
7,287,370 B2 * 10/2007 Rajaram ............ B01D 53/9481
422/170
2006/0260296 A1 * 11/2006 Theis .................... F01N 3/0807
60/286

FOREIGN PATENT DOCUMENTS

KR  10-2011-0063140 A  6/2011
KR  10-2012-0053886 A  5/2012
(Continued)

*Primary Examiner* — Jorge Leon, Jr.
(74) *Attorney, Agent, or Firm* — McDermott Will & Emery LLP

(57) ABSTRACT

A method of calculating a nitrogen oxide (NOx) mass reduced from a lean NOx trap (LNT) during regeneration includes calculating a C3H6 mass flow used to reduce the NOx among a C3H6 mass flow flowing into the LNT of an exhaust purification device, calculating a NH3 mass flow used to reduce the NOx among a NH3 mass flow generated in the LNT, calculating a reduced NOx mass flow based on the C3H6 mass flow used to reduce the NOx and the NH3 mass flow used to reduce the NOx, and calculating the reduced NOx mass by integrating the reduced NOx mass flow over a regeneration period.

11 Claims, 5 Drawing Sheets

(51) Int. Cl.
  *F01N 13/00* (2010.01)
  *F01N 3/20* (2006.01)
  *F02D 41/02* (2006.01)
  *F01N 9/00* (2006.01)
  *F02D 41/14* (2006.01)

(52) U.S. Cl.
  CPC ......... *F01N 3/0842* (2013.01); *F01N 3/2066* (2013.01); *F01N 13/009* (2014.06); *F02D 41/0275* (2013.01); *F01N 3/208* (2013.01); *F01N 3/2073* (2013.01); *F01N 9/005* (2013.01); *F01N 2250/12* (2013.01); *F01N 2430/06* (2013.01); *F01N 2560/025* (2013.01); *F01N 2560/026* (2013.01); *F01N 2560/06* (2013.01); *F01N 2570/12* (2013.01); *F01N 2570/14* (2013.01); *F01N 2570/18* (2013.01); *F01N 2610/02* (2013.01); *F01N 2610/146* (2013.01); *F01N 2900/0412* (2013.01); *F01N 2900/0418* (2013.01); *F01N 2900/0601* (2013.01); *F01N 2900/1402* (2013.01); *F01N 2900/1602* (2013.01); *F01N 2900/1614* (2013.01); *F01N 2900/1616* (2013.01); *F01N 2900/1618* (2013.01); *F02D 2041/1433* (2013.01); *F02D 2200/0806* (2013.01); *Y02T 10/24* (2013.01); *Y02T 10/47* (2013.01)

(58) Field of Classification Search
  CPC ..... F01N 2900/0412; F01N 2900/0418; F01N 2900/0601; F01N 2900/1402; F01N 2900/1602; F01N 2900/1614; F01N 2900/1616; Y02T 10/47
  USPC .......... 60/274, 276, 285, 286, 295, 299, 301
  See application file for complete search history.

(56) References Cited

FOREIGN PATENT DOCUMENTS

| | | |
|---|---|---|
| KR | 10-2012-0060372 A | 6/2012 |
| KR | 10-2012-0060633 A | 6/2012 |

\* cited by examiner

EXHAUST PURIFICATION DEVICE AND METHOD OF CALCULATING NOX MASS REDUCED FROM LEAN NOX TRAP DURING REGENERATION

CROSS-REFERENCE TO RELATED APPLICATION

This application claims the benefit of priority to Korean Patent Application No. 10-2015-0044461, filed with the Korean Intellectual Property Office on Mar. 30, 2015, the entire contents of which are incorporated herein by reference.

TECHNICAL FIELD

The present disclosure relates to a method of calculating a nitrogen oxide (NOx) mass reduced from a lean NOx trap (LNT) during regeneration and an exhaust purification device. More particularly, the present disclosure relates to a method of calculating a NOx mass reduced from an LNT during regeneration and an exhaust purification device that improves a purification efficiency of NOx and fuel efficiency by precisely calculating the NOx reduced at the LNT.

BACKGROUND

Generally, exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter, and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reactions with the reducing agents.

Recently, a lean NOx trap (LNT) catalyst has been used as such a DeNOx catalyst. The LNT catalyst adsorbs the NOx contained in the exhaust gas when an air/fuel ratio is lean, and releases the adsorbed NOx and reduces the released nitrogen oxide and the nitrogen oxide contained in the exhaust gas when the air/fuel ratio is rich.

Since diesel engines are operated at the lean air/fuel ratio, however, it is required to artificially adjust the air/fuel ratio to be the rich air/fuel ratio (hereinafter, it will be called a 'regeneration of the LNT') in order to release the adsorbed NOx from the LNT. For this purpose, a release timing of the NOx adsorbed in the LNT should be precisely determined. Particularly, the NOx mass adsorbed in the LNT should be precisely determined to improve purification efficiency of the NOx and fuel economy and to prevent degradation of the LNT.

In addition, the NOx mass adsorbed in the LNT is a sum of a NOx mass that remained in the LNT at an end of regeneration and a NOx mass newly adsorbed in the LNT after the regeneration. Therefore, a NOx mass that is reduced at the LNT during the regeneration should be precisely calculated.

Further, a portion of NH3 flowing into the LNT during the regeneration and NH3 generated at the LNT slips from the LNT, and the slipped NH3 may be used as reducing agent in a selective catalytic reduction (SCR) catalyst. Therefore, if the NOx mass reduced at the LNT during the regeneration is precisely calculated, a mass of the reducing agent that should be injected by the dosing module and should be supplied into the SCR catalyst may be precisely calculated.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a method of calculating a nitrogen oxide (NOx) mass reduced from a lean NOx trap (LNT) during regeneration and an exhaust purification device having advantages of improving NOx purification efficiency and fuel economy by precisely calculating a NOx mass reduced from the LNT.

Another embodiment of the present disclosure provides a method of calculating a NOx mass reduced from an LNT during regeneration and an exhaust purification device having further advantages of precisely calculating a mass of a reducing agent that should be injected from a dosing module by precisely calculating the NOx mass reduced from the LNT.

A method of calculating a nitrogen oxide (NOx) mass reduced from a lean NOx trap (LNT) during regeneration according to an exemplary embodiment of the present disclosure may include: calculating a C3H6 mass flow used to reduce the NOx among a C3H6 mass flow flowing into the LNT of an exhaust purification device; calculating a NH3 mass flow used to reduce the NOx among a NH3 mass flow flowing into the LNT; calculating a reduced NOx mass flow based on the C3H6 mass flow used to reduce the NOx and the NH3 mass flow used to reduce the NOx; and calculating the reduced NOx mass by integrating the reduced NOx mass flow over a regeneration period.

The calculation of the C3H6 mass flow used to reduce the NOx may include: calculating the C3H6 mass flow flowing into the LNT; calculating a used C3H6 mass flow by using the C3H6 mass flow flowing into the LNT, a NOx adsorption, a lambda at an upstream of the LNT, an LNT temperature, and a rich progress rate; and calculating the C3H6 mass flow used to reduce the NOx by using the used C3H6 mass flow.

The calculation of the NH3 mass flow used to reduce the NOx may include: calculating a mass flow of NH3 generated from C3H6 flowing into the LNT; calculating the NH3 mass flow flowing into the LNT; calculating a total NH3 mass flow that is chemically reactable at the LNT; calculating a used NH3 mass flow by using the total NH3 mass flow that is chemically reactable at the LNT, the NOx adsorption, the lambda at the upstream of the LNT, the LNT temperature, and the rich progress rate; and calculating the NH3 mass flow used to reduce the NOx by using the used NH3 mass flow.

The mass flow of the NH3 generated from the C3H6 flowing into the LNT may be calculated according to the rich progress rate.

The rich progress rate may be defined as an equation of $$\frac{1 - \lambda_{downstream}}{\lambda_{upstream}} \cdot \frac{2 - \lambda_{target}}{\lambda_{target}},$$

wherein, $\lambda_{target}$ is a target lambda, $\lambda_{upstream}$ is the lambda at the upstream of the LNT, and $\lambda_{downstream}$ is a lambda at a downstream of the LNT.

An exhaust purification device according to another exemplary embodiment of the present disclosure may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using reductant including carbon or hydrogen contained in the exhaust gas; and a controller configured to control adsorption and release of the NOx by controlling air/fuel ratio according to the NOx adsorbed in the LNT and a temperature of the exhaust gas, wherein the controller calculates a reduced NOx mass flow based on a C3H6 mass flow used to reduce the NOx among a C3H6 mass flow flowing into the LNT and a NH3 mass flow used to reduce the NOx among a NH3 mass flow flowing into the LNT, and calculates the NOx mass by integrating the reduced NOx mass flow over a regeneration period.

The controller may calculate the C3H6 mass flow used to reduce the NOx by using the C3H6 mass flow flowing into the LNT, a NOx adsorption, a lambda at an upstream of the LNT, an LNT temperature, and a rich progress rate.

The controller may calculate a mass flow of NH3 generated from C3H6 flowing into the LNT, may calculate a total NH3 mass flow that is chemically reactabled at the LNT by using the NH3 mass flow flowing into the LNT and the mass flow of the NH3 generated from the C3H6, and may calculate the NH3 mass flow used to reduce the NOx by using the total NH3 mass flow that is chemically reactable at the LNT, the NOx adsorption, the lambda at the upstream of the LNT, the LNT temperature, and the rich progress rate.

The controller may calculate the mass flow of the NH3 generated from the C3H6 flowing into the LNT is calculated according to the rich progress rate.

The rich progress rate may be defined as an equation of $$\frac{1-\lambda_{downstream}}{\lambda_{upstream}}\Bigg/\frac{2-\lambda_{target}}{\lambda_{target}},$$

wherein, $\lambda_{target}$ is a target lambda, $\lambda_{upstream}$ is the lambda at the upstream of the LNT, and $\lambda_{downstream}$ is a lambda at a downstream of the LNT.

The exhaust purification device may further include: a dosing module mounted at the exhaust pipe downstream of the LNT and configured to directly inject reducing agent into the exhaust gas; and a selective catalytic reduction (SCR) catalyst mounted at the exhaust pipe downstream of the dosing module and configured to reduce the NOx contained in the exhaust gas by using the reducing agent injected by the dosing module, wherein the controller is configured to control an amount of the reducing agent injected by the dosing module according to a NOx mass flow flowing into the SCR catalyst, and wherein the controller calculates a NH3 mass flow slipped from the LNT by using the total NH3 mass flow that is chemically reactable at the LNT, the NOx adsorption, the lambda at the upstream of the LNT, the LNT temperature, and the rich progress rate, and adjusts the amount of the reducing agent injected by the dosing module by considering the slipped NH3 mass flow.

As described above, a regeneration timing of the LNT may be precisely controlled by precisely calculating a NOx mass reduced from the LNT during regeneration. Therefore, purification efficiency of the NOx may be improved and degradation of the LNT may be prevented.

In addition, fuel economy may be improved by preventing unnecessary regeneration of the LNT.

In addition, consumption of a reducing agent injected into an SCR catalyst may be reduced Further, since a reaction model is set by assuming that the C3H6 represents all reductants besides the NH3 as a kind of suitable reductant and all NOx are represented by the NO2, a memory may be reduced and a control process may be simplified.

In addition, even though the reaction model is simplified, suitable prediction results may be obtained.

DETAILED DESCRIPTION

Exemplary embodiments of the present disclosure will hereinafter be described in detail with reference to the accompanying drawings.

Figure 1:
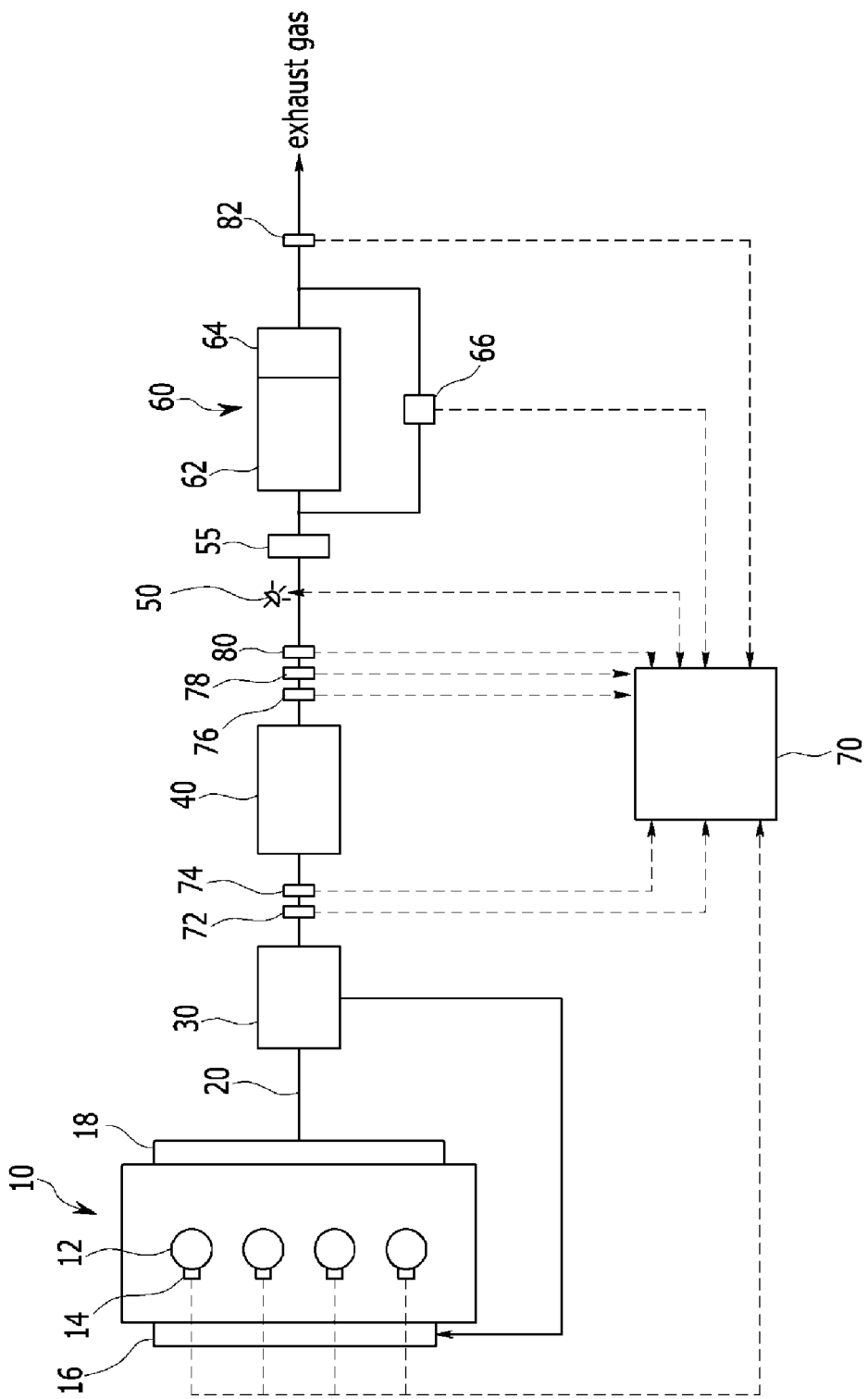
FIG. 1 is a schematic diagram of an exhaust purification device according to an exemplary embodiment of the present disclosure.

FIG. 1 is a schematic diagram of an exhaust purification device according to an exemplary embodiment of the present disclosure.

As shown in FIG. 1, an exhaust system for an internal combustion engine may include an engine 10, an exhaust pipe 20, an exhaust gas recirculation (EGR) apparatus 30, a lean NOx trap (LNT) 40, a dosing module 50, a particulate filter 60, and a controller 70.

The engine 10 burns a air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in a combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbons, carbon monoxide, particulate matter, and nitrogen oxide (NOx) contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling an amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor 72 may be mounted on the exhaust pipe 20 downstream of the exhaust gas recirculation apparatus 30. The first oxygen sensor 72 detects an oxygen amount in the exhaust gas passing through the exhaust gas recirculation apparatus 30 and transmits a signal corresponding thereto to the controller 70 so as to help a lean/rich control of the exhaust gas performed by the controller 70. In this specification, the detected value by the first oxygen sensor 72 is called a lambda ($\lambda_{upstream}$) at an upstream of the LNT.

In addition, a first temperature sensor 74 may be mounted on the exhaust pipe 20 downstream of the exhaust gas recirculation apparatus 30 and detects a temperature of the exhaust gas passing through the exhaust gas recirculation apparatus 30.

The LNT 40 is mounted on the exhaust pipe 20 downstream of the exhaust gas recirculation apparatus 30. The LNT 40 adsorbs the nitrogen oxide (NOx) contained in the exhaust gas at a lean air/fuel ratio, and releases the adsorbed nitrogen oxide and reduces the nitrogen oxide contained in the exhaust gas or the released nitrogen oxide at a rich air/fuel ratio. In addition, the LNT 40 may oxidize carbon monoxide (CO) and one or more hydrocarbons (HC) contained in the exhaust gas. In this specification, releasing the NOx adsorbed in the LNT 40 by making the rich air/fuel ratio will be called a 'regeneration of the LNT'.

Herein, the hydrocarbon represents all compounds consisting of carbon and hydrogen contained in the exhaust gas and the fuel.

A second oxygen sensor 76, a second temperature sensor 78, and a first NOx sensor 80 may be mounted on the exhaust pipe 20 downstream of the LNT 40.

The second oxygen sensor 76 may detect an oxygen amount contained in exhaust gas flowing into the particulate filter 60 and transmit a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called a lambda ($\lambda_{downstream}$) at a downstream of the LNT.

The second temperature sensor 78 may detect a temperature of the exhaust gas flowing into the particulate filter 60 and transmit a signal corresponding thereto to the controller 70.

The first NOx sensor 80 may detect a NOx concentration contained in the exhaust gas flowing into the particulate filter 60 and transmit a signal corresponding thereto to the controller 70. The NOx concentration detected by the first NOx sensor 80 may be used to determine an amount of reducing agent injected by the dosing module 50.

The dosing module 50 may be mounted on the exhaust pipe 20 upstream of the particulate filter 60 and inject the reducing agent into the exhaust gas by control of the controller 70. Typically, the dosing module 50 injects urea and the injected urea is hydrolyzed and converted into ammonia. However, the reducing agent is not limited to the ammonia.

A mixer 55 may be mounted on the exhaust pipe 20 downstream of the dosing module 50 and may mix the reducing agent and the exhaust gas evenly.

The particulate filter 60 may be mounted on the exhaust pipe downstream of the mixer 55, trap particulate matter contained in the exhaust gas, and reduce the nitrogen oxide contained in the exhaust gas using the reducing agent injected by the dosing module 50. For these purposes, the particulate filter 60 may include a selective catalytic reduction catalyst on a diesel particulate filter (SDPF) 62 and an additional selective catalytic reduction (SCR) catalyst 64, but is not limited thereto.

It is to be understood that an SCR catalyst in this specification and claim includes the SCR catalyst itself or the SDPF.

The SDPF 62 is formed by coating the SCR on walls defining channels of the DPF. Generally, the DPF includes a plurality of inlet channels and outlet channels. Each of the inlet channels includes an end that is open and an other end that is blocked, and receives the exhaust gas from a front end of the DPF. In addition, each of the outlet channels includes an end that is blocked and an other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR catalyst 64 may be mounted at the rear of the SDPF 62. The additional SCR catalyst 64 further reduces the nitrogen oxide if the SDPF 62 purifies the nitrogen oxide completely. The additional SCR catalyst 64 may be mounted physically apart from the SDPF 62.

Meanwhile, a pressure difference sensor 66 may be mounted on the exhaust pipe 20. The pressure difference sensor 66 detects a pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than a predetermined pressure. In this case, the injector 14 post-injects the fuel so as to burn the particulate matter trapped in the particulate filter 60.

In addition, a second NOx sensor 82 may be mounted on the exhaust pipe 20 downstream of the particulate filter 60.

The second NOx sensor 82 may detect a concentration of the nitrogen oxide contained in the exhaust gas exhausted from the particulate filter 60, and transmit a signal corresponding thereto to the controller 70. The controller 70 can check, based on the detected value by the second NOx sensor 82, whether the nitrogen oxide contained in the exhaust gas is normally removed in the particulate filter 60. That is, the second NOx sensor 82 may be used to evaluate performance of the particulate filter 60.

The controller 70 may determine a driving condition of the engine based on the signals transmitted from each sensor, and perform the leans/rich control and control the amount of the reducing agent injected by the dosing module 50 based on the driving condition of the engine. For example, the controller 70 may remove nitrogen oxide from the LNT 40 (in this specification, it will be called the 'regeneration of the LNT') by controlling the air/fuel ratio to be rich, and may remove nitrogen oxide from the SDPF 60 by injecting a reducing agent. The lean/rich control may be performed by controlling a fuel amount injected by the injector 14.

The controller 70 may be provided with a plurality of maps and a plurality of models defining characteristics of the LNT, and may calculate a NOx mass reduced from the LNT during regeneration based thereon. The plurality of maps and models may be set through a number of experiments.

In addition, the controller 70 may control a regeneration of the particulate filter 60 and desulfurization of the LNT 40.

For these purposes, the controller 70 can be realized by one or more processors activated by a predetermined program, and the predetermined program can be programmed to perform each step of method of calculating a NOx mass reduced from the LNT during regeneration according to an exemplary embodiment of the present disclosure.

Figure 2:
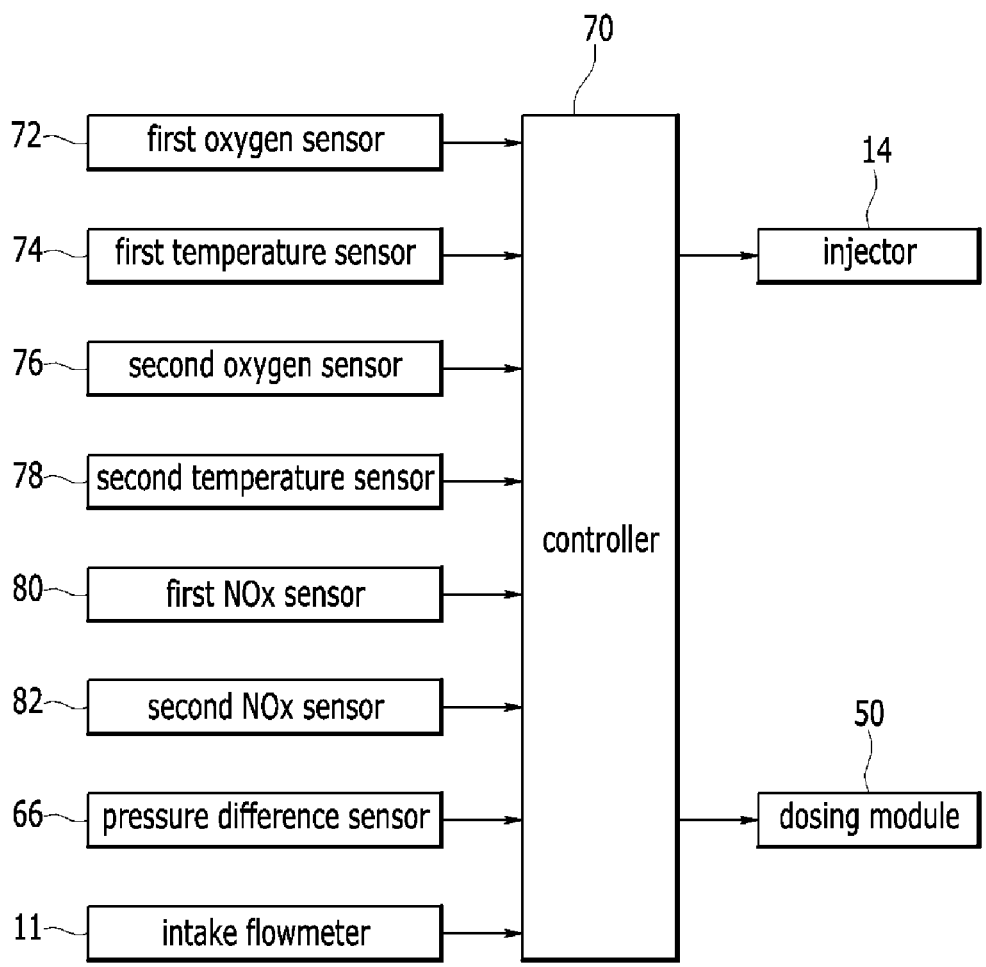
FIG. 2 is a block diagram illustrating a relationship of an input and output of a controller used in a method of calculating a NOx mass reduced from an LNT during regeneration according to an exemplary embodiment of the present disclosure.

FIG. 2 is a block diagram illustrating a relationship of an input and an output of a controller used in a method of calculating a NOx mass reduced from an LNT during regeneration according to an exemplary embodiment of the present disclosure.

As shown in FIG. 2, the first oxygen sensor 72, the first temperature sensor 74, the second oxygen sensor 76, the second temperature sensor 78, the first NOx sensor 80, the second NOx sensor 82, the pressure difference sensor 66 and an intake flowmeter 11 may be electrically connected to the controller 70, and transmit the detected values to the controller 70.

The first oxygen sensor 72 may detect the oxygen amount in the exhaust gas passing through the exhaust gas recirculation apparatus 30 and transmit the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as an upstream lambda ($\lambda_{upstream}$). The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 may detect the temperature of the exhaust gas passing through the exhaust gas recirculation apparatus 30 and transmit the signal corresponding thereto to the controller 70.

The second oxygen sensor 76 may detect an oxygen amount in the exhaust gas flowing into the particulate filter 60 and transmit the signal corresponding thereto to the controller 70. The detected value by the second oxygen sensor 76 may be represented as a downstream lambda ($\lambda_{downstream}$).

The controller 70 performs the regeneration of the LNT using the upstream lambda and the downstream lambda.

The second temperature sensor 78 detects a temperature of the exhaust gas flowing into the particulate filter 60 and transmits a signal corresponding thereto to the controller 70.

The first NOx sensor 80 detects a NOx concentration contained in the exhaust gas flowing into the particulate filter 60 and transmits a signal corresponding thereto to the controller 70.

The second NOx sensor 82 detects a NOx concentration contained in the exhaust gas exhausted from the particulate filter 60 and transmits a signal corresponding thereto to the controller 70.

The pressure difference sensor 66 detects a pressure difference between a front end portion and a rear end portion of the particulate filter 60 and transmits a signal corresponding thereto to the controller 70.

The intake flowmeter 11 detects an intake air flow supplied to an intake system of the engine 10 and transmits a signal corresponding thereto to the controller 70.

The controller 70 may determine the driving condition of the engine, fuel injection amount, fuel injection timing, fuel injection pattern, injection amount of the reducing agent, regeneration timing of the particulate filter 60, and desulfurization/regeneration timing of the LNT 40 based on the transmitted value, and output a signal for controlling the injector 14 and the dosing module 50 to the injector 14 and the dosing module 50. In addition, the controller 70 may calculate the NOx mass reduced from the LNT 40 during regeneration based on the transmitted values.

Meanwhile, a plurality of sensors other than the sensors illustrated in FIG. 2 may be mounted in the exhaust purification device according to the exemplary embodiment of the present disclosure. For better comprehension and ease of description, however, description of the plurality of sensors will be omitted.

Figure 3:
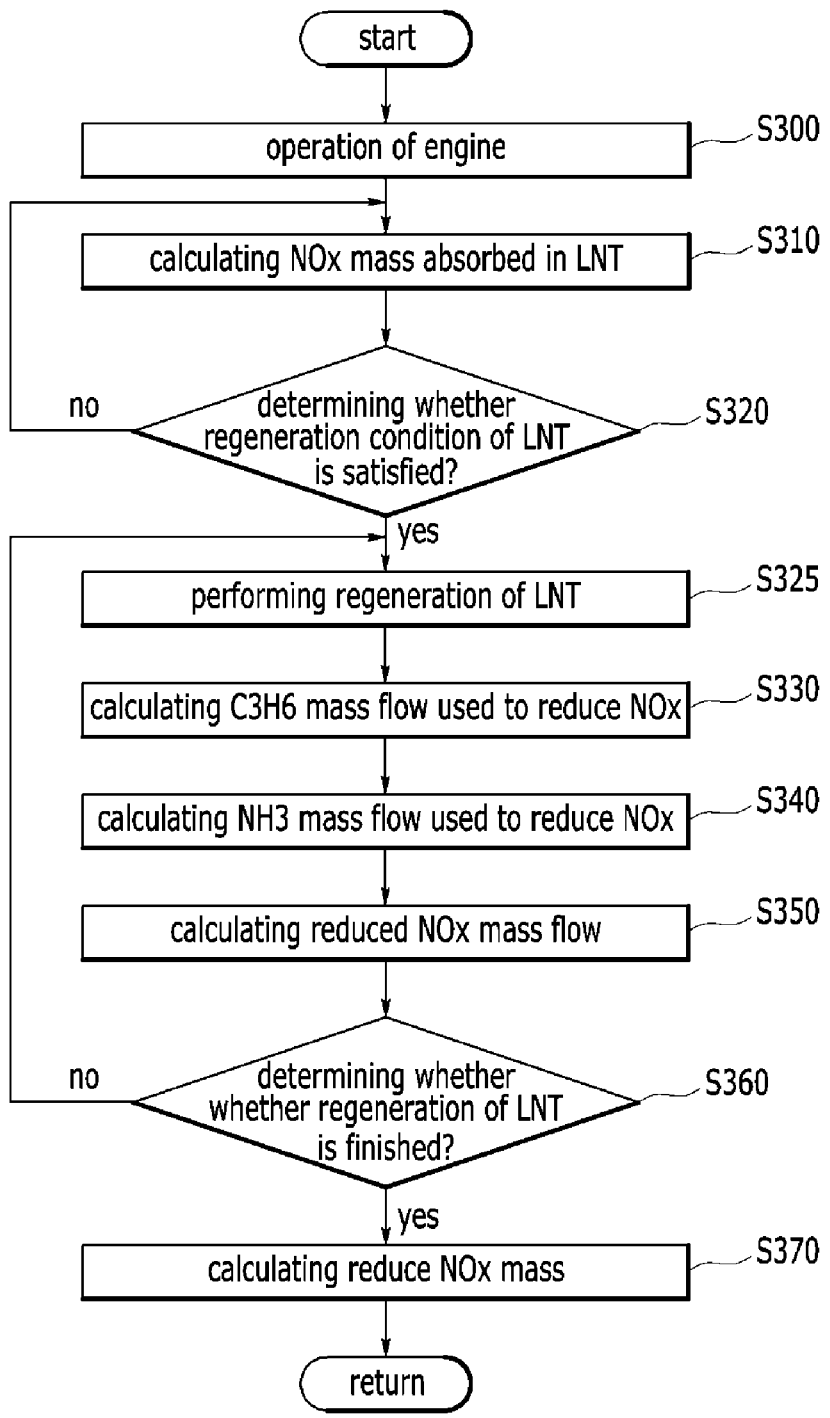
FIG. 3 is a flowchart of a method of calculating a NOx mass reduced from an LNT during regeneration according to an exemplary embodiment of the present disclosure.
Figure 4:
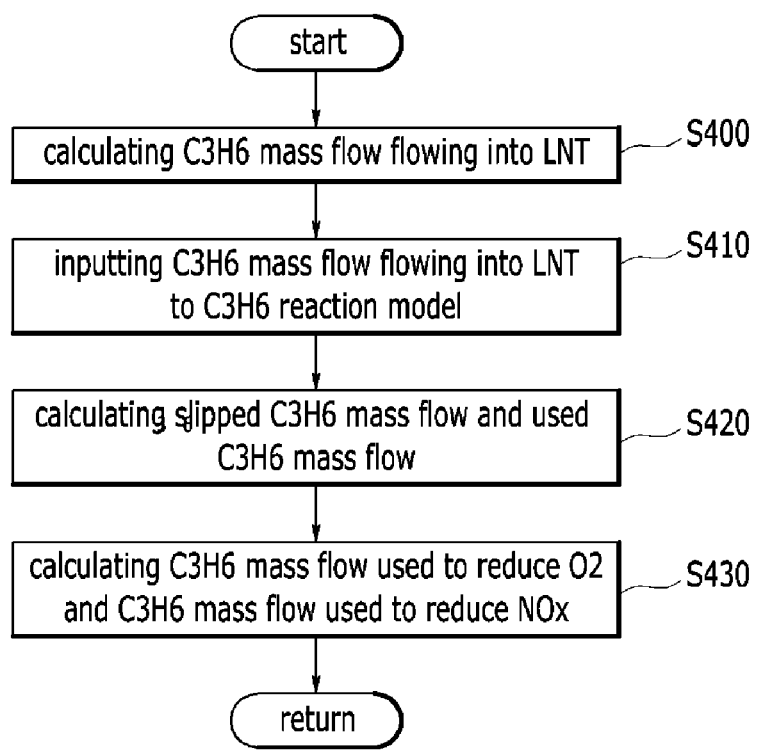
FIG. 4 is a flowchart showing detailed processes of the step S330 in FIG. 3.
Figure 5:
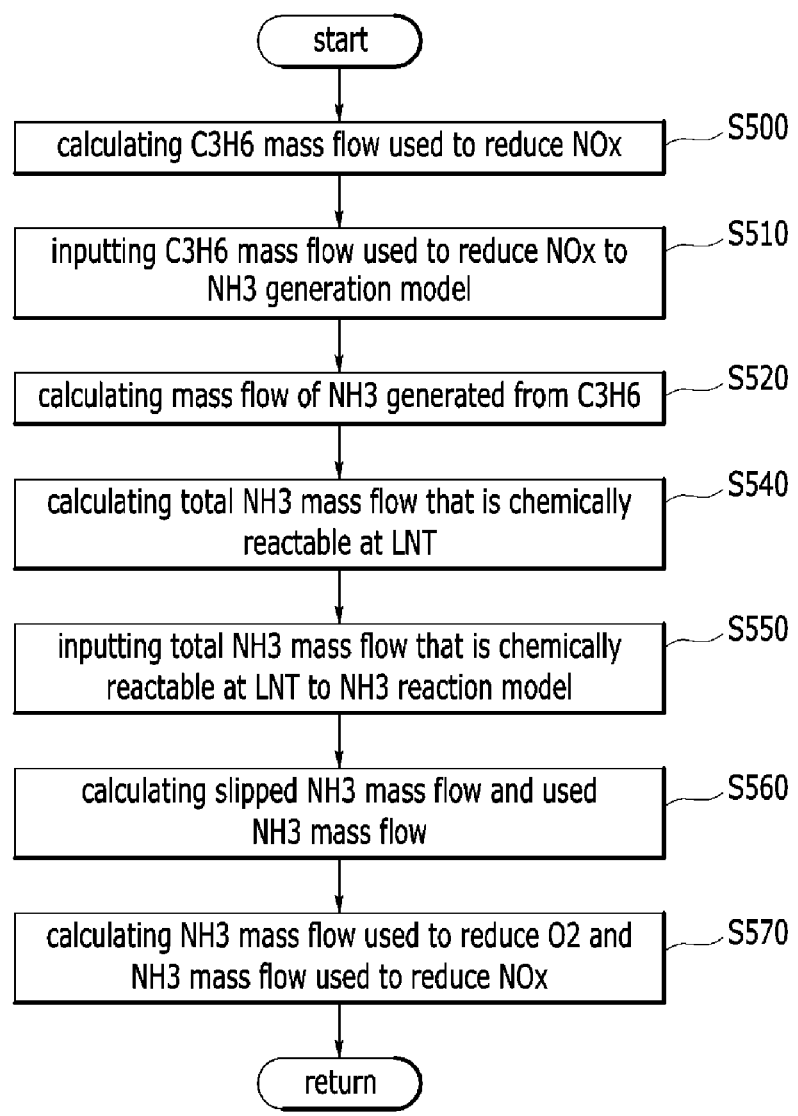
FIG. 5 is a flowchart showing detailed processes of the step S340 in FIG. 3.

Hereinafter, referring to FIG. 3 to FIG. 5, a method of calculating the NOx mass reduced from the LNT during regeneration according to an exemplary embodiment of the present disclosure will be described in detail FIG. 3 to FIG. 5 are flowcharts of a method of calculating the NOx mass reduced from the LNT during regeneration according to an exemplary embodiment of the present disclosure.

As shown in FIG. 3, a method of calculating the NOx mass reduced from the LNT during regeneration according to an exemplary embodiment of the present disclosure may begin with operation of the engine 10 at step S300. If the engine 10 is operated, the controller 70 may calculate a NOx mass adsorbed in the LNT 40 at step S310. According to one example of a method of calculating the NOx mass adsorbed in the LNT 40, the NOx mass adsorbed in the LNT 40 may be calculated by integrating a value obtained by subtracting a NOx mass flow thermally released from the LNT 40, a NOx mass flow released from the LNT 40 during regeneration, and a NOx mass flow that chemically reacts with reductant at the LNT 40 from a NOx mass flow stored in the LNT 40. A number of methods of calculating the NOx mass adsorbed in the LNT 40 are known to a person skilled in the art, and any method among a number of the methods of calculating the NOx mass adsorbed in the LNT 40 may be used.

The controller 70 may determine whether a regeneration condition of the LNT 40 is satisfied based on the NOx mass adsorbed in the LNT 40 at step S320. For example, if the NOx mass adsorbed in the LNT 40 is larger than or equal to a predetermined NOx amount, the controller 70 may determine that the regeneration condition of the LNT 40 is satisfied.

If the regeneration condition of the LNT 40 is not satisfied, the controller 70 may return to the step S310 and calculate the NOx mass adsorbed in the LNT 40. If the regeneration condition of the LNT 40 is satisfied, the controller 70 may perform a regeneration of the LNT 40 at step 325. That is, the controller 70 may control the air/fuel ratio to be rich so as to cause the NOx to be released from the LNT 40.

While performing the regeneration of the LNT 40, the controller 70 may calculate a C3H6 mass flow used to reduce the NOx at step S330. Hereinafter, referring to FIG. 4, the calculation of the C3H6 mass flow used to reduce the NOx will be described in detail.

As shown in FIG. 4, the controller 70 may calculate a C3H6 mass flow flowing into the LNT 40 at step S400. The C3H6 mass flow flowing into the LNT 40 may be calculated based on a driving condition of the engine 10 such as the intake air flow, a fuel amount injected into the engine 10, a combustion temperature, a combustion pressure, a temperature of the exhaust gas, and so on. Herein, a mass flow means a mass per unit time. The mass is calculated by integrating the mass flow over a time.

After that, the controller 70 may input the C3H6 mass flow flowing into the LNT 40 to a C3H6 reaction model at step S410. If the C3H6 mass flow flowing into the LNT 40, the temperature of the LNT 40, the NOx mass adsorbed in the LNT 40, the lambda ($\lambda_{upstream}$) at the upstream of the LNT 40, and the rich progress rate are input to the C3H6 reaction model, a mass flow of the C3H6 that does not react in the LNT 40 and slips from the LNT 40 and a used C3H6 mass flow that reacts in the LNT 40 are calculated at step S420. Herein, the rich progress rate is defined as the following equation.

$$\text{Rich progress rate} = \frac{\frac{1 - \lambda_{downstream}}{\lambda_{upstream}}}{\frac{2 - \lambda_{target}}{\lambda_{target}}},$$

Herein, $\lambda_{target}$ is a target lambda, $\lambda_{upstream}$ is the lambda at the upstream of the LNT, and $\lambda_{downstream}$ is the lambda at the downstream of the LNT.

In addition, the controller 70 may calculate a C3H6 mass flow used to reduce the O2 and a C3H6 mass flow used to reduce the NOx based on the used C3H6 mass flow at step S430. At this time, following equations may be used.

C3H6+2NO2+O2→2NH3+3CO2

C3H6+4.5NO2→2.25N2+3CO2+3H2O

C3H6+4.5O2→3CO2+3H2O

In addition, reaction coefficients that are ratios of mass flows of C3H6 participating in respective reactions to a mass flow of C3H6 participating in all the reactions according to the temperature of the LNT 40, the NOx mass adsorbed in the LNT 40, the lambda at the upstream of the LNT 40 ($\lambda_{upstream}$), and the rich progress rate, are stored in the C3H6 reaction model. Therefore, a mass flow of the C3H6 used to reduce the O2 and a mass flow of the C3H6 used to reduce the NOx may be calculated on the basis of the mass flow of the C3H6 participating in the reactions, the reaction coefficients, and molar masses of the C3H6, the NO2, the O2, the N2, the NH3, and the H2O. In addition, a NH3 mass flow generated from the C3H6 is also calculated.

It is exemplified in this specification that the C3H6 represents all reductants besides the NH3 as a kind of substitute reductant and all NOx are represented by NO2. From a number of experimental results, it is confirmed that a suitable result is produced though a reaction model where the C3H6 is used as a kind of substitute reductant (besides NH3) and all NOx are represented by the NO2. Even though a reductant type and a NOx type are restricted, all components are represented and calculated correctly within the reaction model. Therefore, the reaction model may be simplified and a capacity of the memory in which the reaction model is stored may be reduced.

Referring to FIG. 3, the controller 70 may calculate a NH3 mass flow used to reduce the NOx at step S340. Hereinafter, referring to FIG. 5, the calculation of the NH3 mass flow used to reduce the NOx will be described in detail.

As shown in FIG. 5, the controller 70 may calculate the C3H6 mass flow used to reduce the NOx at step S500 (see FIG. 4). The controller 70 may input the C3H6 mass flow used to reduce the NOx, the temperature of the LNT 40, the NOx mass adsorbed in the LNT 40, the lambda at the upstream of the LNT 40 ($\lambda_{upstream}$), and the rich progress rate to a NH3 generation model at step S510, and calculate a mass flow of the NH3 generated from the C3H6 at step S520. Particularly, the NH3 is not generated at an initial stage of LNT regeneration but is generated after rich control has proceeded to a suitable degree. Therefore, the mass flow of the NH3 generated from the C3H6 should be calculated according to the rich progress rate. As described above, the mass flow of the NH3 generated from the C3H6 can be calculated from the reaction equation of the C3H6 and the NO2. Therefore, the NH3 generation model may be a part of or be independent from the C3H6 reaction model.

After that, the controller 70 may calculate a total NH3 mass flow that is chemically reactable at the LNT 40 based on the mass flow of the NH3 generated from the C3H6 at step S540. The total NH3 may be, but is not limited to be, the same as the mass flow of the NH3 generated from the C3H6.

After that, the controller 70 may input the total NH3 mass flow that is chemically reactable at the LNT 40 to a NH3 reaction model at step S550. If the total NH3 mass flow that is chemically reactable at the LNT 40, the temperature of the LNT 40, the NOx mass adsorbed in the LNT 40, the lambda ($\lambda_{upstream}$) at the upstream of the LNT 40, and the rich progress rate are input to the NH3 reaction model, a mass flow of the NH3 that does not react in the LNT 40 and slips from the LNT 40 and a used NH3 mass flow that reacts in the LNT 40 are calculated at step S560. In addition, the controller 70 may calculate a NH3 mass flow used to reduce the O2 and a NH3 mass flow used to reduce the NOx based on the used NH3 mass flow at step S570. At this time, following equations may be used.

NH3+1.75O2→NO2+1.5H2O

2NH3+1.5NO2→1.75N2+3H2O

The reaction coefficients that are ratios of mass flows of NH3 participating in respective reactions to a mass flow of NH3 participating in all the reactions according to the temperature of the LNT 40, the NOx mass adsorbed in the LNT 40, the lambda at the upstream of the LNT 40 ($\lambda_{upstream}$), and the rich progress rate, are stored in the NH3 reaction model. Therefore, a mass flow of the NH3 used to reduce the O2 and a mass flow of the NH3 used to reduce the NOx may be calculated on the basis of the mass flow of the NH3 participating in the reactions, the reaction coefficients, and molar masses of the NH3, the NO2, the O2, the N2, the NH3, and the H2O.

Referring to FIG. 3, the controller 70 may calculate a reduced NOx mass flow based on the C3H6 mass flow used to reduce the NOx among the C3H6 mass flow flowing into the LNT 40 and the NH3 mass flow used to reduce the NOx at step S350. That is, the reduced NOx mass flow may be calculated from the above-mentioned reaction equations.

After that, the controller 70 may determine whether the regeneration of the LNT 40 is finished at step S360. That is, if the rich progress rate becomes 1 (i.e., the upstream lambda and the downstream lambda are the same as the target lambda), the controller 70 finishes the regeneration of the LNT 40. If the regeneration of the LNT 40 does not finish, the controller 70 returns to the step S325.

Finally, the controller 70 may integrate the reduced NOx mass flow over a regeneration period so as to calculate the reduced NOx mass at step S370.

As described above, the controller 70 may calculate the slipped NH3 mass flow at the step S560. That is, the NH3 mass flow that slips from the LNT 40 is calculated. All the NH3 slipped from the LNT 40 flows into the SDPF 60 (or SCR catalyst). Therefore, when calculating the amount of the reducing agent (urea) injected by the dosing module 50, the controller 70 takes into account the NH3 mass flow slipped from the LNT 40. That is, the controller 70 calculates the amount of the reducing agent that should be injected by the dosing module 50 based on the NOx mass flowing into the SDPF 60 for a predetermined time, and calculates the amount of the reducing agent that is actually injected by the dosing module 50 by subtracting a value obtained by integrating the NH3 mass flow slipped from the LNT 40 over the predetermined time from the amount of the reducing agent that should be injected by the dosing module 50. Therefore, it is prevented that the NH3 slips from the SDPF 60 and consumption of the reducing agent may be reduced.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of calculating a nitrogen oxide (NOx) mass reduced from a lean NOx trap (LNT) during regeneration, comprising:
    calculating a C3H6 mass flow used to reduce the NOx among a C3H6 mass flow flowing into the LNT of an exhaust purification device;
    calculating a NH3 mass flow used to reduce the NOx among a NH3 mass flow generated in the LNT;
    calculating a reduced NOx mass flow based on the C3H6 mass flow used to reduce the NOx and the NH3 mass flow used to reduce the NOx;
    calculating the reduced NOx mass by integrating the reduced NOx mass flow over a regeneration period; and
    controlling a mass of a reducing agent injected into a selective catalytic reduction (SCR) catalyst based on the calculated reduced NOx mass.

2. The method of claim 1, wherein the step of calculating the C3H6 mass flow used to reduce the NOx comprises:
    calculating the C3H6 mass flow flowing into the LNT;
    calculating a used C3H6 mass flow by using the C3H6 mass flow flowing into the LNT, a NOx adsorption amount, a lambda value at an upstream of the LNT, an LNT temperature, and a rich progress rate; and
    calculating the C3H6 mass flow used to reduce the NOx by using the used C3H6 mass flow.

3. The method of claim 2, wherein the step of calculating the NH3 mass flow used to reduce the NOx comprises:
    calculating a mass flow of NH3 generated from C3H6 flowing into the LNT;
    calculating a total NH3 mass flow that is chemically reactable at the LNT;
    calculating a used NH3 mass flow by using the total NH3 mass flow that is chemically reactable at the LNT, the NOx adsorption amount, the lambda value at the upstream of the LNT, the LNT temperature, and the rich progress rate; and
    calculating the NH3 mass flow used to reduce the NOx by using the used NH3 mass flow.

4. The method of claim 3, wherein the mass flow of the NH3 generated from the C3H6 flowing into the LNT is calculated according to the rich progress rate.

5. The method of claim 2, wherein the rich progress rate is defined as an equation of $$\frac{1 - \frac{\lambda_{downstream}}{\lambda_{upstream}}}{\frac{2 - \lambda_{target}}{\lambda_{target}}},$$

wherein, $\lambda_{target}$ is a target lambda value, $\lambda_{upstream}$ is the lambda value at the upstream of the LNT, and $\lambda_{downstream}$ is a lambda value at a downstream of the LNT.

6. An exhaust purification device comprising:
    an engine including an injector for injecting a fuel thereinto, generating power by burning a mixture of air and the fuel, and exhausting an exhaust gas generated during a combustion process to the exterior thereof through an exhaust pipe;
    a lean NOx trap (LNT) mounted on the exhaust pipe, for adsorbing nitrogen oxide (NOx) contained in the exhaust gas at a lean air/fuel ratio, releasing the adsorbed nitrogen oxide at a rich air/fuel ratio, and reducing the nitrogen oxide contained in the exhaust gas or the released nitrogen oxide using a reductant including carbon or hydrogen contained in the exhaust gas; and
    a controller for controlling adsorption and release of the NOx by controlling an air/fuel ratio according to the NOx adsorbed in the LNT and a temperature of the exhaust gas,
    wherein the controller calculates a reduced NOx mass flow based on a C3H6 mass flow used to reduce the NOx among a C3H6 mass flow flowing into the LNT and a NH3 mass flow used to reduce the NOx among a NH3 mass flow generated in the LNT, calculates a reduced NOx mass by integrating the reduced NOx mass flow over a regeneration period, and controls a mass of a reducing agent injected into a selective catalytic reduction (SCR) catalyst based on the calculated reduced NOx mass.

7. The exhaust purification device of claim 6, wherein the controller calculates the C3H6 mass flow used to reduce the NOx by using the C3H6 mass flow flowing into the LNT, a NOx adsorption amount, a lambda value at an upstream of the LNT, an LNT temperature, and a rich progress rate.

8. The exhaust purification device of claim 7, wherein the controller calculates a mass flow of NH3 generated from C3H6 flowing into the LNT, calculates a total NH3 mass flow that is chemically reactable at the LNT by using the mass flow of the NH3 generated from the C3H6, and calculates the NH3 mass flow used to reduce the NOx by using the total NH3 mass flow that is chemically reactable at the LNT, the NOx adsorption amount, the lambda value at the upstream of the LNT, the LNT temperature, and the rich progress rate.

9. The exhaust purification device of claim 8, wherein the controller calculates the mass flow of the NH3 generated from the C3H6 flowing into the LNT is calculated according to the rich progress rate.

10. The exhaust purification device of claim 7, wherein the rich progress rate is defined as an equation of $$\frac{1 - \lambda_{downstream}}{\frac{\lambda_{upstream}}{2 - \lambda_{target}}},$$

wherein, $\lambda_{target}$ is a target lambda value, $\lambda_{upstream}$ is the lambda value at the upstream of the LNT, and $\lambda_{downstream}$ is a lambda value at a downstream of the LNT.

11. The exhaust purification device of claim 6, further comprising:
a dosing module mounted at the exhaust pipe downstream of the LNT for directly injecting a reducing agent into the exhaust gas; and
a selective catalytic reduction (SCR) catalyst mounted at the exhaust pipe downstream of the dosing module for reducing the NOx contained in the exhaust gas by using the reducing agent injected by the dosing module,
wherein the controller controls an amount of the reducing agent injected by the dosing module according to a NOx mass flow flowing into the SCR catalyst, and
wherein the controller calculates a NH3 mass flow slipped from the LNT by using the total NH3 mass flow that is chemically reactable at the LNT, the NOx adsorption amount, the lambda value at the upstream of the LNT, the LNT temperature, and the rich progress rate, and adjusts the amount of the reducing agent injected by the dosing module by considering the slipped NH3 mass flow.

\* \* \* \* \*